(12) United States Patent
Wu et al.

(10) Patent No.: US 10,712,628 B2
(45) Date of Patent: Jul. 14, 2020

(54) DISPLAY CONTROL IN DISPLAY DEVICES (71) Applicant: HEWLETT-PACKARD DEVELOPMENT COMPANY, L.P., Houston, TX (US)

(72) Inventors: Kuan-Ting Wu, Taipei (TW); Wei-Kuang Chu, Taipei (TW); Xuan-Fang Shi, Taipei (TW)

(73) Assignee: Hewlett-Packard Development Company, L.P., Spring, TX (US)

(*) Notice: Subject to any disclaimer, the term of this patent is extended or adjusted under 35 U.S.C. 154(b) by 155 days.

(21) Appl. No.: 16/092,907

(22) PCT Filed: Jul. 29, 2016

(86) PCT No.: PCT/US2016/044783
§ 371 (c)(1),
(2) Date: Oct. 11, 2018

(87) PCT Pub. No.: WO2018/022098
PCT Pub. Date: Feb. 1, 2018

(65) Prior Publication Data
US 2019/0171080 A1    Jun. 6, 2019

(51) Int. Cl.
G02F 1/01        (2006.01)
G02F 1/163       (2006.01)
(Continued)

(52) U.S. Cl.
CPC .......... *G02F 1/163* (2013.01); *C09K 9/02* (2013.01); *G02F 1/153* (2013.01); *G02F 1/155* (2013.01);
(Continued)

(58) Field of Classification Search
CPC ...... G02F 1/163; G02F 1/153; G02F 1/15165; G02F 1/155; G02F 1/13338;
(Continued)

(56) References Cited

U.S. PATENT DOCUMENTS 6,819,467 B2    11/2004   Lynam
7,190,506 B1     3/2007   Berneth et al.
(Continued)

FOREIGN PATENT DOCUMENTS

| | | |
|---|---|---|
| CN | 104290377 | 1/2015 |
| JP | 2013033249 A | 2/2013 |
| JP | 2016075807 A | 5/2016 |

OTHER PUBLICATIONS

Naijoh, Y. et al, "Multi-Layered Electrochromic Display", Dec. 7-9, 2011.

*Primary Examiner* — William R Alexander
*Assistant Examiner* — Henry A Duong
(74) *Attorney, Agent, or Firm* — HPI Patent Department (57) ABSTRACT The present subject matter relates to display control in display devices. In an example implementation, a display control layer for a display device comprises a first set of channels filled with a first electrochromic material to control a view angle of a display from the display device, and a second set of channels filled with a second electrochromic material to control absorption of blue/ultraviolet (UV) light from the display device. Each adjacent pair of channels of the second set sandwiches a channel of the first set.

15 Claims, 7 Drawing Sheets

(51) Int. Cl.
*G02F 1/153* (2006.01)
*G02F 1/1516* (2019.01)
*C09K 9/02* (2006.01)
*G02F 1/155* (2006.01)
G02F 1/1333 (2006.01)

(52) U.S. Cl.
CPC ...... *G02F 1/15165* (2019.01); *G02F 1/13338* (2013.01); *G02F 2201/086* (2013.01); *G02F 2201/44* (2013.01); *G02F 2202/28* (2013.01)

(58) Field of Classification Search
CPC ........... G02F 2201/44; G02F 2201/086; G02F 2202/28; G02F 1/15; G02F 1/1506; G02F 1/1514; G02F 1/1516; G02F 1/157; G02F 1/161; G02F 2001/15145; G02F 2001/1517; G02F 2001/1518; G02F 2001/1536; G02F 2001/1552; G02F 2001/1555; G02F 2001/1557; G02F 2001/164; C09K 9/02
USPC ........................................................ 359/265
See application file for complete search history.

(56) References Cited

U.S. PATENT DOCUMENTS

| | | |
|---|---|---|
| 9,229,253 B2 | 1/2016 | Schwartz et al. |
| 2005/0207002 A1 | 9/2005 | Liu et al. |
| 2005/0270619 A1 | 12/2005 | Johnson et al. |
| 2006/0262057 A1 | 11/2006 | Sumiyoshi |
| 2014/0232960 A1* | 8/2014 | Schwartz ................ B32B 3/30 349/12 |
| 2016/0011441 A1 | 1/2016 | Schwartz et al. |

* cited by examiner

DISPLAY CONTROL IN DISPLAY DEVICES

BACKGROUND

Electronic and communication devices, such as computers, personal digitals assistants, mobile phone, and televisions, have a display device for displaying contents to users. The display device of such electronic and communication devices may include a liquid crystal display (LCD) unit, a light emitting diode (LED) display screen, an organic LED display screen, a polymer LED display screen, a plasma display screen, and such.

BRIEF DESCRIPTION OF DRAWINGS

The following detailed description references the drawings, wherein.

DETAILED DESCRIPTION

Display devices may include liquid crystal display (LCD), light emitting diode (LED), or plasma based display screens for displaying contents. Such display screens have an array of color pixels that can be selectively excited for displaying the contents. The spaces between the color pixels in the array are covered or superimposed by substantially opaque crosslines, referred to as tracks of a black matrix. The tracks of the black matrix block light which may otherwise leak out through the spaces between the color pixels, thereby improving the contrast and sharpness of the displayed contents.

Electronic devices, for example, desktop computers, laptops, tablets, and smartphones, are often utilized by users for online banking, online trading, insurance, finance, writing exams, accessing medical records, etc. Such activities involve accessing of personal data of users and displaying of such data on display devices associated with the electronic devices. The personal data of a user, displayed on a display device, may be sensitive to be viewed by others in the vicinity of the display device.

The display devices generally display contents with wide view angles. With wide view angles, personal data of users G visible and thus can be viewed almost from all directions in front of the display device. The wide view angles of the display device may affect security of personal data of user. Such data may have to be protected from prying eyes in the vicinity of the display device. Further, the display devices may emit blue and ultraviolet (UV) light during the display of contents. Viewing the display devices for long durations may be harmful for the eyes of the users.

The present subject matter relates to controlling of displays on display devices to protect and maintain privacy of personal data of users from prying eyes and to protect eyes of the users from prolong viewing of the display devices. The present subject matter describes display control films which when affixed on a display screen of a display device enable view angle control and blue/UV light absorption control for displays from the display screen. The present subject matter also describes display devices and electronic devices having such display devices which are enabled for view angle control and blue/UV light absorption control.

In accordance with an example implementation of the present subject matter, a display control film includes an adhesive layer and a display control layer over the adhesive layer. The adhesive layer enables the display control film to be pasted on a display screen of a display device. The display control layer includes a first set of channels filled with a first electrochromic material which facilitate in controlling a view angle of a display from the display device. The display control layer also includes a second set of channels filled with a second electrochromic material which facilitate in controlling absorption of blue/UV light from the display device. The first set of channels may be referred to as privacy-gate channels, and the second set of channels may be referred to as blue/UV light absorption channels. The first set of channels and the second set of channels are arranged in such a way that each adjacent pair of channels of the second set sandwiches a channel of the first set.

In an example implementation, the first electrochromic material may include, but not restricted to, naphtalendiimide-functionalized PEDOT, poly(1,4-bis(2-thienyl)-naphthalene) (PBTN), poly(2,6-bis(2-thienyl)naphthalene) (P(2,6-BTN)), poly(2,8-bis-(4-dodecyl-thiophen-2-yl)-dibenzethiophene) (PDBT-3DTh), and poly(2,8-bis-(4-dodecyl-thiophen-2-yl)-dibenzofuran) (PDBF-3DTh). The second electrochromic material may include, but not restricted to, $WO_3$, $MoO_3$, $TiO_2$, $Ta_2O_5$, $Nb_2O_5$, $CeVO_4$, $SnO_2$, $IrO_2$, $CoO_2$, $MnO_2$, $FeO_2$, $Cr_2O_3$, $RhO_2$, $V_2O_5$, Prussian yellow, biphenyl-4,4'-diamine derivatives, 2,4,8-triphenyl-1,4'-bipyridine-1,1'-diium derivatives, viologen derivatives, pyridine derivatives, cyanine derivatives, styryl derivatives, poly [4,4-dioctyl-Cyclopentadithiophene-alt-4,7-(piazthiole)] (PDOCPDT-Cz), and N,N'-diphenyl-N,N'-diphenylene-phenylene diamine derivatives.

For controlling the view angle of the display from the display screen having the display control film, a first variable voltage may be applied across the first set of channels. The first variable voltage alters the transmission properties of the first electrochromic material in the first set of channels, thereby varying and controlling the degree of view angle of the display. The view angle can be controlled to restrict the display of the contents within a narrower angle range in front of the user, and the contents cannot be viewed from directions outside of the narrower angle range. For the purpose of controlling the blue/UV light absorption from the display screen having the display control film, a second variable voltage may be applied across the second set of channels. The second variable voltage alters the transmission properties of the second electrochromic material, thereby varying and controlling the degree of blue/UV light absorption from the display screen. It may be noted that, for the purpose of controlling the view angle and the blue/UV light absorption together, the first variable voltage may be applied across the first set of channels and the second variable voltage may be applied across the second set of channels.

In an example implementation, the first set of channels and the second set of channels in the display control layer may be longitudinal channels arranged in the same plane and in one direction. With the first set of channels arranged in one direction, the first variable voltage may be selectively provided across a plurality of channels of the first set in a specific portion of the display control film to control a view angle of a display from that portion of the display screen. For example, the first variable voltage may be provided across a plurality of channels of the first set to control a view angle of a display from the left-portion or the right-portion of the display screen.

In an example implementation, the first set of channels may be in the form of a matrix of longitudinal channels arranged row-wise and column-wise and in the same plane. With the matrix arrangement, each row-wise channel of the first set is sandwiched between two row-wise channels of the second set, and each column-wise channel of the first set is sandwiched between two column-wise channels of the second set. With the first set of channels arranged in the form of a matrix, the first variable voltage may be selectively provided across a plurality of longitudinal channels arranged row-wise in the matrix to control a view angle of a display, for example, from the top-portion or the bottom-portion of the display screen. Similarly, the first variable voltage may be selectively provided across a plurality of longitudinal channels arranged column-wise in the matrix to control a view angle of a display, for example, from the left-portion or the right-portion of the display screen.

In accordance with an example implementation of the present subject matter, a display control layer similar to that in the display control film may be directly fabricated on a display screen of a display device. The display screen may have color pixels, with spaces between the color pixels covered by tracks of a black matrix. In an example implementation, the display control layer may be fabricated on the display screen, such that the first set of channels with the first electrochromic material overlaps the tracks of the black matrix.

With the display control film and the display devices of the present subject matter, display from display screens can be selectively controlled for restricting the view angles of the display, absorption of the blue/UV light from the display screens, or both. The degree of view angles and blue/UV light absorption can be controlled, on the fly, in real-time, by varying the voltages across the first set of channels and the second set of channels. Further, the view angle can be controlled for a selective portion, for example, the top-portion, the bottom-portion, the right-portion, or the left-portion, of the display screen.

The following detailed description refers to the accompanying drawings. Wherever possible, the seine reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Figure 1:
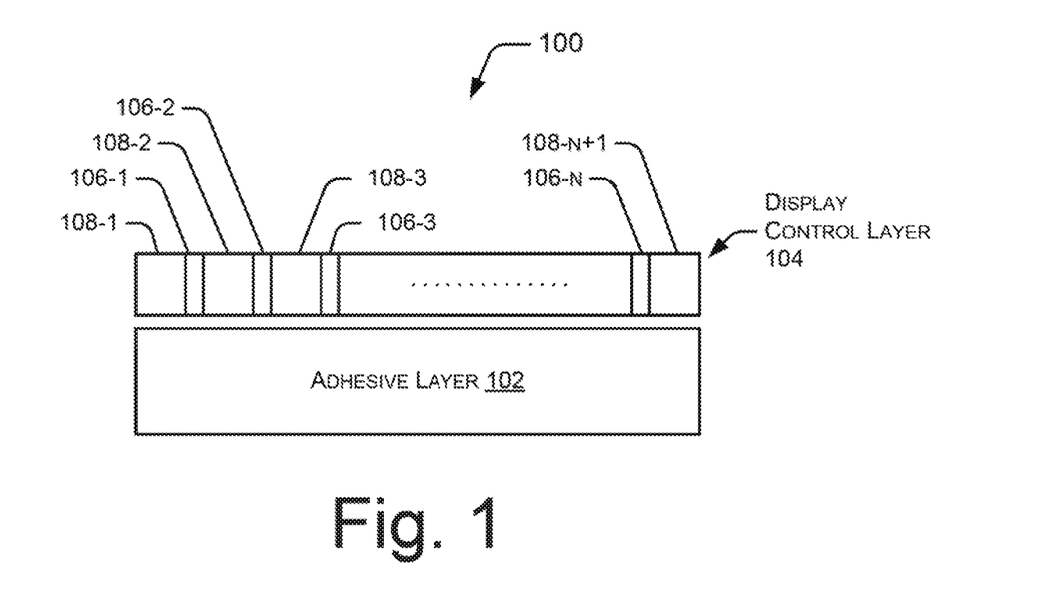
FIG. 1 illustrates a sectional view of display control film, according to an example implementation of the present subject matter.

FIG. 1 illustrates a sectional view of display control film 100, according to an example implementation of the present subject matter. The display control film 100 includes an adhesive layer 102 through which the display control film 100 can be pasted on a display screen of a display device. The adhesive layer 102 may be of a thickness of about 5 μm to about 30 μm, and may be made of optically clear adhesives and optically clear resins, such as polyacrylics, polycarbonates, cyclic olefin copolymers, polyethylene terephthalate (PET) and the like.

The display control film 100 includes a display control layer 104 over the adhesive layer 102. The display control layer 104 includes a set of privacy-gate channels 106-1, 106-2, ..., 106-N, and a set of blue/UV light absorption channels 108-1, 108-2, ..., 108-N+1. The set of privacy-gate channels, collectively referred to as 106, are filled with a first electrochromic material. The set of blue/UV light absorption channels, collectively referred to as 108, are filled with a second electrochromic material. The first electrochromic material may include, but not restricted to, naphtalendiimide-functionalized PEDOT, poly(1,4-bis(2-thienyl)-naphthalene) (PBTN), poly(2,6-bis(2-thienyl)naphthalene) (P(2,6-BTN)), poly(2,8-bis-(4-dodecyl-thiophen-2-yl)-dibenzothiophene) (PDBT-3DTh), and poly(2,8-bis-(4-dodecyl-thiophen-2-yl)-dibenzofuran) (PDBF-3DTh). The second electrochromic material may include, but not restricted to, $WO_3$, $MoO_3$, $TiO_2$, $Ta_2O_5$, $Nb_2O_5$, $CeVO_4$, $SnO_2$, $IrO_2$, $CoO_2$, $MnO_2$, $FeO_2$, $Cr_2O_3$, $RhO_2$, $V_2O_5$, Prussian yellow, biphenyl-4,4'-diamine derivatives, 2,4,6-triphenyl-1,4'-bipyridine-1,1'-diium derivatives, viologen derivatives, pyridine derivatives, cyanine derivatives, styryl derivatives, poly [4,4-dioctyl-Cyclopentadithiophene-alt-4, 7-(piazthiole)] (PDOCPDT-Cz), and N,N'-diphenyl-N,N'-diphenylene-phenylene diamine derivatives.

As shown in FIG. 1, each privacy-gate channel of the set 106 is placed between and interfaced with two blue/UV light absorption channels of the set 108. Further, each privacy-gate channel of the set 106 may have a width in a range from about 10 μm to about 100 μm, and a height in a range from about 100 μm to about 300 μm. Similarly, each blue/UV light absorption channel of the set 108 may have a width in a range from about 200 μm to about 500 μm, and a height in a range from about 100 μm to about 300 μm. The lengths of the privacy-gate channels and the blue/UV light absorption channels may be equal to each other.

In an example implementation, the display control film 100 also includes transparent electrodes (not shown in FIG. 1) coupled to each of the privacy-gate channels of the set 106 and coupled to each of the blue/UV light absorption channels of the set 108 for providing variable voltages across the first electrochromic material and the second electrochromic material. The transparent electrodes may be in the form of nanowires or a mesh of materials including, but not restricted to, indium tin oxide, silver, poly(3,4-ethylenedioxythiophene) polystyrene sulfonate (PEDOT: PSS), or a combination thereof. In an example implementation, the transparent electrodes can be nanotubes of carbon, graphene, PEDOT:PSS or a combination thereof.

Further, in an example implementation, the display control film 100 may include a first glass or plastic substrate layer (not shown in FIG. 1) between the display control layer 104 and the adhesive layer 102. The display control film 100 may also include a second glass or plastic substrate layer (not shown in FIG. 1) as a cover layer over the display control layer 104. The first and the second glass or plastic substrate layers may be of a thickness in a range from about 30 μm, to about 500 μm. The first and the second glass or plastic substrate layers may provide structural stability and strength to the display control film 100.

Figure 2:
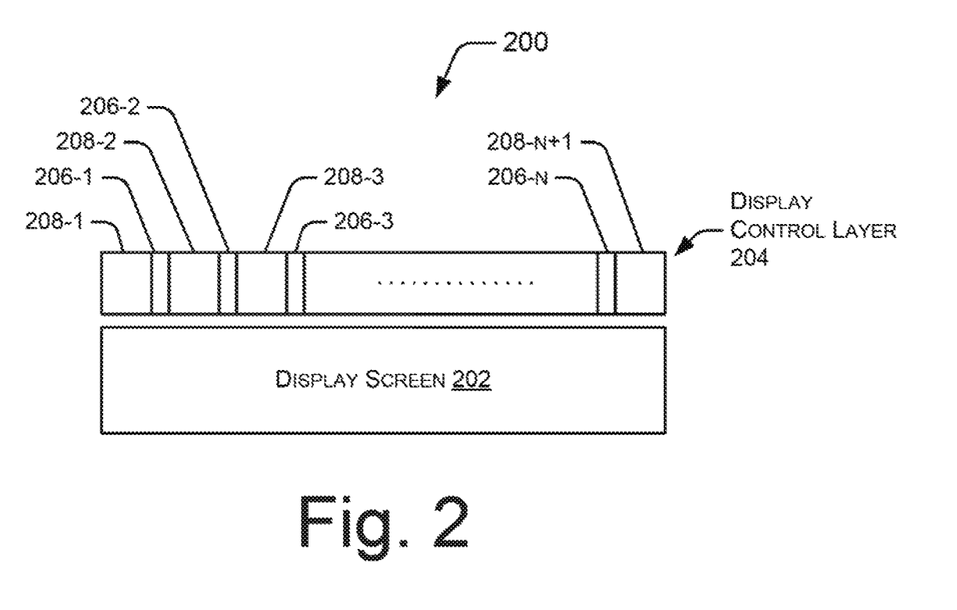
FIG. 2 illustrates a sectional view of a display device, according to an example implementation of the present subject matter.

FIG. 2 illustrates a sectional view of a display device 200, according to an example implementation of the present subject matter. The display device 200 may be implemented in various ways. For example, the display device 200 may be implemented as monitors for desktop computers, and display screens of laptops, mobile phones, tablets, electronic readers, televisions, etc. The display device 200 includes a display screen 202 having color pixels (not shown) and a black matrix (not shown) over the color pixels. The black matrix is arranged over the color pixels such that the tracks of the black matrix cover spaces between the color pixels. In an example implementation, the display screen 202 may include an LCD unit, an LED display screen, an organic LED display screen, a polymer LED display screen, a plasma display screen, and such.

The display device 200 includes a display control layer 204 over the display screen 202. The display control layer 204 includes a set of privacy-gate channels 206-1, 206-2, . . . , 206-N filled with the first electrochromic material, and a set of blue/UV light absorption channels 208-1, 208-2, . . . , 208-N+1 filled with the second electrochromic material, similar to the display control layer 104 of the display control film 100, as described earlier. The set of privacy-gate channels in the display control layer 204 may be collectively referred to as 206, and the set of blue/UV light absorption channels in the display control layer 204 may be collectively referred to as 208. The arrangement and the dimensions of the set of privacy-gate channels 206 and the set of blue/UV light absorption channels 208 in the display control layer 204 are similar to those in the display control layer 104 of the display control film 100, as described earlier. In an example implementation, the set of privacy-gate channels 206 may overlap the tracks of the black matrix of the display screen 202.

In an example implementation, each of the privacy-gate channels of the set 206 and each of the blue/UV light absorption channels of the set 208 are coupled to a respective transparent electrodes (not shown in FIG. 2). The transparent electrodes are coupled for providing variable voltages across the first electrochromic material and the second electrochromic material. The transparent electrodes coupled to the sets 206 and 208 may be similar to those in the display control layer 104 of the display control film 100, as described earlier.

Further, in an example implementation, the display device 200 may also include a first glass or plastic substrate layer (not shown in FIG. 2) between the display control layer 204 and the display screen 202. The display device 200 may also include a second glass or plastic substrate layer (not shown in FIG. 2) over the display control layer 204. The first and the second glass or plastic substrate layers may be of a thickness in a range from about 25 µm to about 500 µm. The first and the second glass or plastic substrate layers may provide structural stability and strength to the display device 200. Further, in an example implementation, the display device 200 may include a touch sensor layer as a cover layer on top. The touch sensor layer may be a capacitive touch sensor layer or a resistive touch sensor layer, which makes the display screen 202 sensitive to touches by users or a stylus.

In an example implementation, the set of privacy-gate channels 106, 206 and the set of blue/UV light absorption channels 108, 208 in the display control layer 104, 204 are arranged in one direction in a plane of the display control film 100 or the display screen 202. With such an arrangement, the privacy-gate channels and the blue/UV light absorption channels may get positioned row-wise or column-wise on the display screen.

In an example implementation, the set of privacy-gate channels 106, 206 includes a matrix of longitudinal channels arranged row-wise and column-wise in a plane of the display control film 100 or the display screen 202. The longitudinal channels in the matrix are separated by the blue/UV light absorption channels 108, 208 both row-wise and column-wise. With such an arrangement, the privacy-gate channels and the blue/UV light absorption channels cover the display screen as a cross-mesh. Also, with such an arrangement, the transparent electrodes for privacy-gate channels and the blue/UV light absorption channels form a bridge structure, or are separated by an insulating layer, at the regions of overlap of any two channels.

Figure 3:
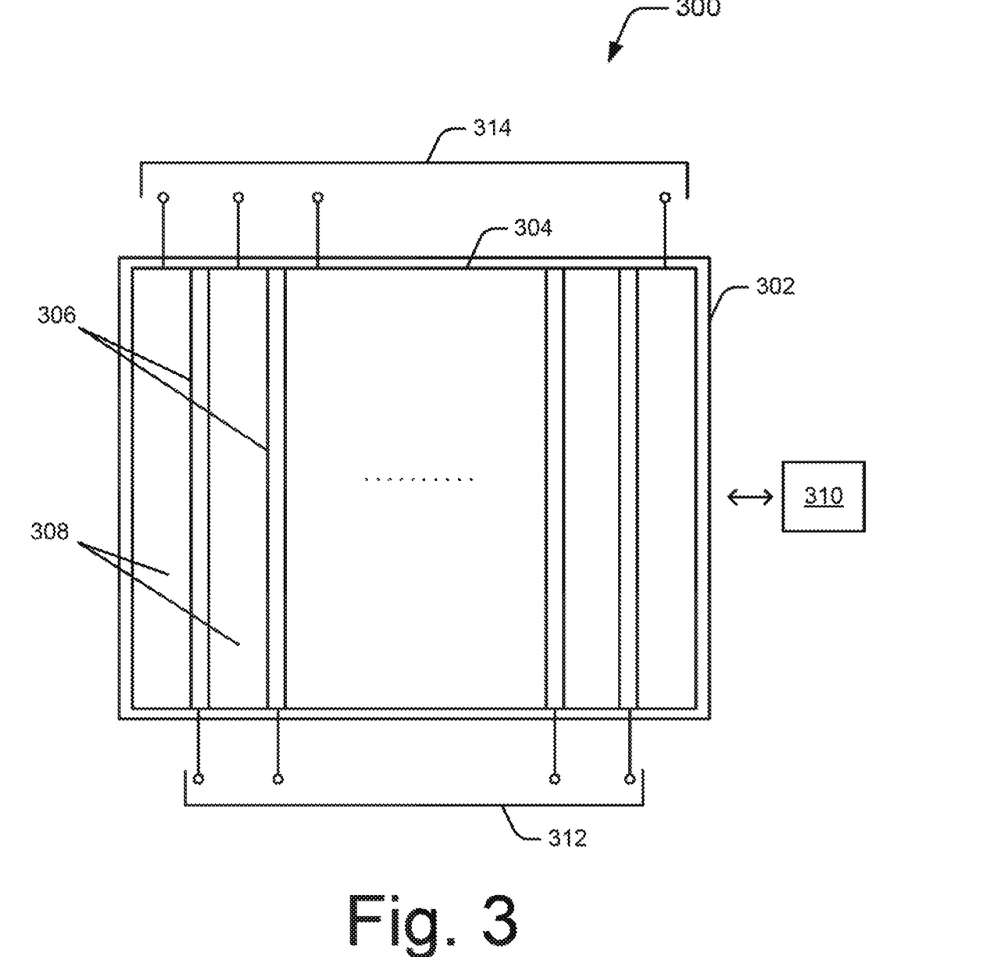
FIG. 3 illustrates a top view of a display device, according to an example implementation of the present subject matter.

FIG. 3 illustrates a top view of a display device 300, according to an example implementation of the present subject matter. The display device 300 includes a display screen 302 and a display control layer 304 on the display screen 302. The display control layer 304 may be a layer fabricated directly on the display screen 302 as in the case of the display device 200, or may be a layer of a display control film similar to the display control film 100. The display control layer 304 includes a set of privacy-gate channels 306 and a set of blue/UV light absorption channels 308 similar to those in the display control layer 104 and 204.

As depicted in FIG. 3, the set of privacy-gate channels 306 and the set of blue/UV light absorption channels 308 are arranged in one direction, and may overlapping the tracks of the black matrix in that direction. The display device 300 includes a display mode controller 310. The display mode controller 310 is electrically coupled to the set of privacy-gate channels 306 and the set of blue/UV light absorption channels 308 to selectively operate the display device 300 in one of a view angle control mode, a blue/UV light absorption mode, and a view angle control and blue/UV light absorption mode. The display mode controller 310 is electrically coupled to the set of privacy-gate channels 306 and the set of blue/UV light absorption channels 308 through separate electrical connection lines so that the display mode controller 310 can separately and selectively provide voltages across the privacy-gate channels and the blue/UV light absorption channels. The display mode controller 310 may be coupled to the privacy-gate channels through electrical connection lines 312 and may be coupled to the blue/UV light absorption channels through electrical connection line 314.

The display rode controller 310 may operate the display device 300 in the view angle control mode by providing a first variable voltage across the set of privacy-gate channels 306 through the electrical connection lines 312. The display mode controller 310 may operate the display device 300 in the blue/UV light absorption mode by providing a second variable voltage across the set of blue/UV light absorption channels 308 through the electrical connection lines 314. Further, the display mode controller 310 may operate the display device 300 in the view angle control and blue/UV light absorption mode by providing the first variable voltage across the set of privacy-gate channels 306 and the second variable voltage across the set of blue/UV light absorption channels 308 through the respective electrical connection lines 312 and 314.

In an example implementation, the display mode controller 310 may receive a user input, referred to as a first user input, indicative of the view angle control mode, or the blue/UV light absorption mode, or the view angle control and blue/UV light absorption mode, as selected by a user. The display mode controller 310 may provide voltages across the privacy-gate channels and/or the blue/UV light absorption channels depending on the mode selected by the user.

In an example implementation, while operating in the view angle control mode, the display mode controller 310 may receive a user input, referred to as a second user input, indicative of a specific view angle of the display. In an example, the second user input may be to restrict the view angle to ±10°, ±20°, or any other angle about a perpendicular on a plane of the display device 300. The display mode controller 310 may apply the first variable voltage across the set of privacy-gate channels 306 depending on the view angle indicated by the second user input.

Further, in an example implementation, while operating in the blue/UV light absorption mode, the display mode controller 310 may receive a user input, referred to as a third user input indicative of a specific degree of blue/UV light absorption from the display. In an example, the third user input may be to absorb blue/UV light by 10%, 20%, or any other percentage value. The display mode controller 310 may apply the second variable voltage across the set of blue/UV light absorption channels 308 depending on the degree of blue/UV light absorption indicated by the third user input.

Further, in an example implementation, while operating in the view angle control and blue/UV light absorption mode, the display mode controller 310 may receive a user input, referred to as a fourth user input, indicative of a specific view angle of the display, and receive another user input, referred to as a fifth user input, indicative of a specific degree of blue/UV light absorption from the display. The display mode controller 310 may apply the first variable voltage across the set of privacy-gate channels 306 and apply the second variable voltage across the set of blue/UV light absorption channels 308 depending on the fourth user input and the fifth user input, respectively.

Further, in an example implementation, while operating in the view angle control mode or in the view angle control and blue/UV light absorption mode, the display mode controller 310 may receive a user input, referred to as a sixth user input, indicative of a specific portion of the display for which view angle is to be controlled. For the arrangement in which the set of privacy-gate channels are arranged column-wise, as shown in FIG. 3, the specific portion may, for example, be the right-portion or the left-portion of the display. For the arrangement in which the set of privacy-gate channels are arranged row-wise, the specific portion may, for example, be the top-portion or the bottom-portion of the display. The display mode controller 310 may selectively provide the first variable voltage across a plurality of privacy-gate channels to control the view angle of the specific portion of the display depending on the sixth user input. For example, when the sixth user input indicates right-portion, the display mode controller 310 provides the first variable voltage to a plurality of privacy-gate channels on the right half of the display control layer 304 to control the view angle of the display from the right-portion of the display screen 302. Similarly, when the sixth user input indicates left-portion, the display mode controller 310 provides the first variable voltage to a plurality of privacy-gate channels on the left half of the display control layer 304 to control the view angle of the display from the left-portion of the display screen 302.

Figure 4:
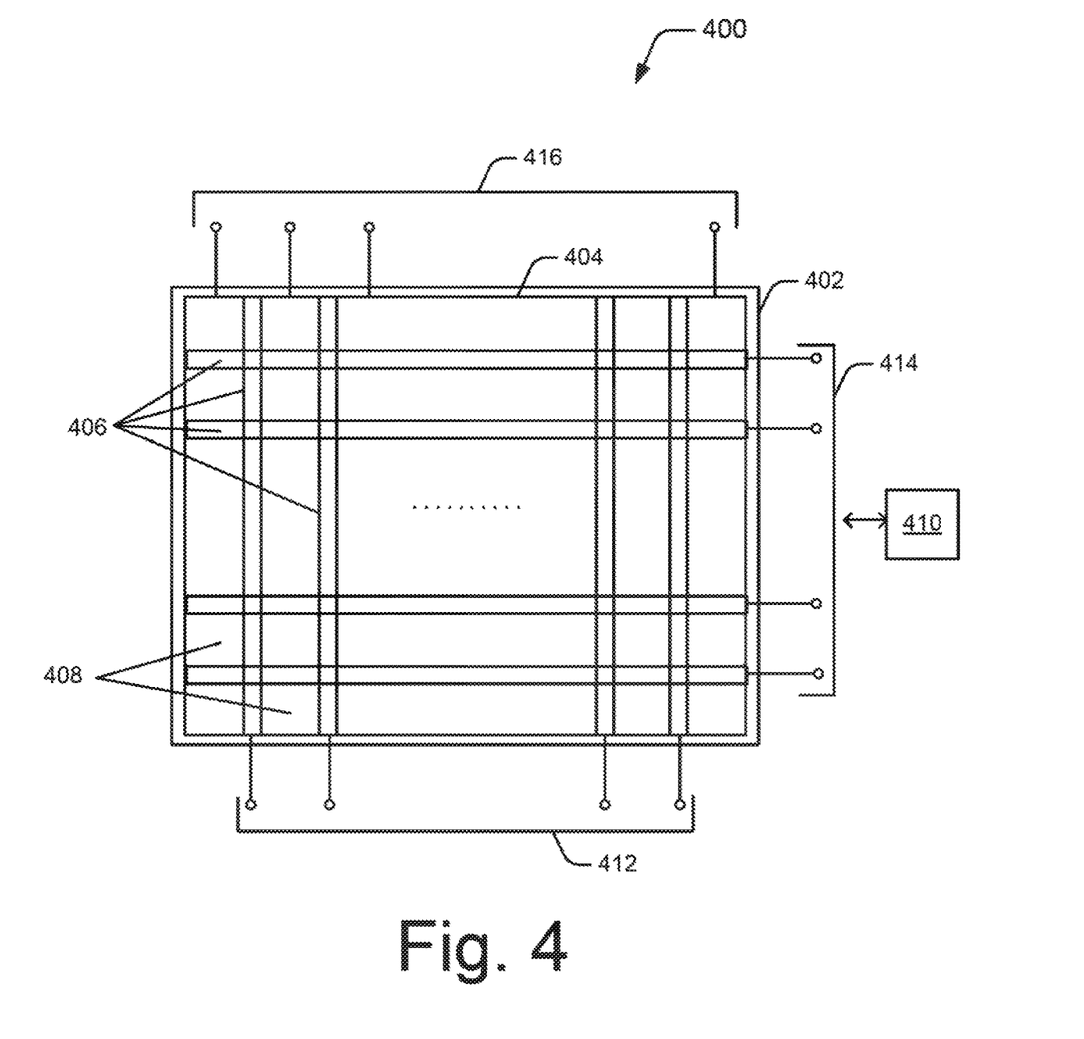
FIG. 4 illustrates a top view of a display device, according to an example implementation of the present subject matter.

FIG. 4 illustrates a top view of a display device 400, according to an example implementation of the present subject matter. The display device 400 includes a display screen 402 and a display control layer 404 on the display screen 402. The display control layer 404 may be a layer fabricated directly on the display screen 402 as in the case of the display device 200, or may be a layer of a display control film similar to the display control film 100. The display control layer 404 includes a set of privacy-gate channels 406 and a set of blue/UV light absorption channels 408 similar to those €n the display control layer 104 and 204.

As depicted in FIG. 4, the set of privacy-gate channels 406 are in the form of a matrix of longitudinal channels arranged row-wise and column-wise. The set of privacy-gate channels 406 may overlap the tracks of the black matrix in both the directions. The display device 400 includes a display mode controller 410. The display mode controller 410 is electrically coupled to each of the longitudinal channels of the matrix formed by the set 406 and each of the blue/UV light absorption channels of the set 408 to selectively operate the display device 400 in one of a view angle control mode, a blue/UV light absorption mode, and a view angle control and blue/UV light absorption mode. The display mode controller 410 relay be coupled to the row-wise longitudinal channels, i.e., the row-wise privacy-cote channels through electrical connection lines 412. The display mode controller 410 may be coupled to the column-wise longitudinal channels, i.e., the column-wise privacy-gate channels through electrical connection lines 414. The display mode controller 410 may be coupled to the set of blue/UV light absorption channels 408 through electrical connection line 416.

The display mode controller 410 may operate the display device 400 in the view angle control mode by providing a first variable voltage across the set of privacy-gate channels 406 through the electrical connection lines 412 and 414. The display mode controller 410 may operate the display device 400 in the blue/UV light absorption mode by providing a second variable voltage across the set of blue/UV light absorption channels 408 through the electrical connection lines 416. Further, the display mode controller 410 may operate the display device 400 in the view angle control and blue/UV light absorption mode by providing the first variable voltage across the set of privacy-gate channels 406 and the second variable voltage across the set of blue/UV light absorption channels 408 through the respective electrical connection lines 412, 414, and 416.

In an example implementation, the display mode controller 410 may receive user inputs similar to the first user input to the fifth user input described earlier, and accordingly provide voltages across the privacy-gate channels and/or the blue/UV light absorption channels to operate in either of the view angle control mode, the blue/UV light absorption mode, or the view angle control and blue/UV light absorption mode with a specific view angle of the display and a specific degree of blue/UV light absorption from the display, as indicated by the user inputs.

Further, in an example implementation, while operating in the view angle control mode or in the view angle control and blue/UV light absorption mode, the display mode controller 410 may receive a user input, referred to as a seventh user input, indicative of a specific portion of the display for which view angle is to be controlled. For the arrangement as shown in FIG. 4, the specific portion may, for example, be the right-portion or the left-portion or the top-portion or the bottom-portion of the display. The display mode controller 410 may selectively provide the first variable voltage across a plurality of privacy-gate channels to control the view angle of the specific portion of the display depending on the seventh user input. For example, when the seventh user input indicates right-portion, the display mode controller 410 provides the first variable voltage to a plurality of longitudinal channels arranged column-wise on the right half of the matrix formed by the set 406 to control the view angle of the display from the right-portion of the display screen 402. Similarly, when the seventh user input indicates left-portion, the display mode controller 410 provides the first variable voltage to a plurality of longitudinal channels arranged column-wise on the left half of the matrix formed by the set 406 to control the view angle of the display from the left-portion of the display screen 402. Similarly, when the seventh user input indicates top-portion, the display mode controller 410 provides the first variable voltage to a plurality of longitudinal channels arranged row-wise on the top half of the matrix formed by the set 406 to control the view angle of the display from the top-portion of the display screen 402. Similarly, when the seventh user input indicates bottom-portion, the display mode controller 410 provides the first variable voltage to a plurality of longitudinal channels arranged column-wise on the bottom half of the matrix formed by the set 406 to control the view angle of the display from the bottom-portion of the display screen 402.

In an example implementation, the display mode controller 310, 410 amongst other things, may include routines, programs, objects, components, data structures, and the like, which perform particular tasks or implement particular abstract data types. The display mode controller 310, 410 may be coupled to, and executed by, a processor (not shown) to perform various functions for the purposes of operating the display device 300, 400 in one of the view angle control mode, the blue/UV light absorption mode, and the view angle control and blue/UV light absorption mode, in accordance with the present subject matter. In an example implementation, the processor may be implemented as microprocessors, microcomputers, microcontrollers, digital signal processors, central processing units, state machines, logic circuitries, and/or any devices that manipulate signals based on operational instructions. Among other capabilities, the processor may fetch and execute computer-readable instructions stored in a memory coupled to the processor. The memory may be a memory of the display mode controller 310, 410, and may include any non-transitory computer-readable storage medium including, for example, volatile memory (e.g., RAM), and/or non-volatile memory (e.g., EPROM, flash memory, NVRAM, memristor, etc.). The functions of the display mode controller 310, 410 may be provided through the use of dedicated hardware as well as hardware capable of executing computer-readable instructions.

In an example implementation, the display control layer 304, 404 includes transparent electrodes coupled to each of the privacy-gate channels and each of the blue/UV light absorption channels for providing variable voltages across the first electro chromic material and the second electrochromic material, respectively. The transparent electrodes may be similar to those described earlier for the display control layers 104 and 204. The electrical connection lines 312, 412, 414 are electrically coupled with the privacy-gate channels in the display control layer 304, 404 through the respective transparent electrodes. Similarly, the electrical connection line 314, 416 are electrically coupled with the blue/UV light absorption channels in the display control layer 304, 404 through the respective transparent electrodes.

It may be noted that the display control film 100 has to be affixed on a display screen of a display device to enable it for view angle control and blue/UV light absorption control in accordance with the present subject matter. In an example implementation, the display screen may have markings so that the transparent electrodes in the display control film are appropriately aligned with electrical connection lines coupled to a display mode controller of the display device.

Figure 5:
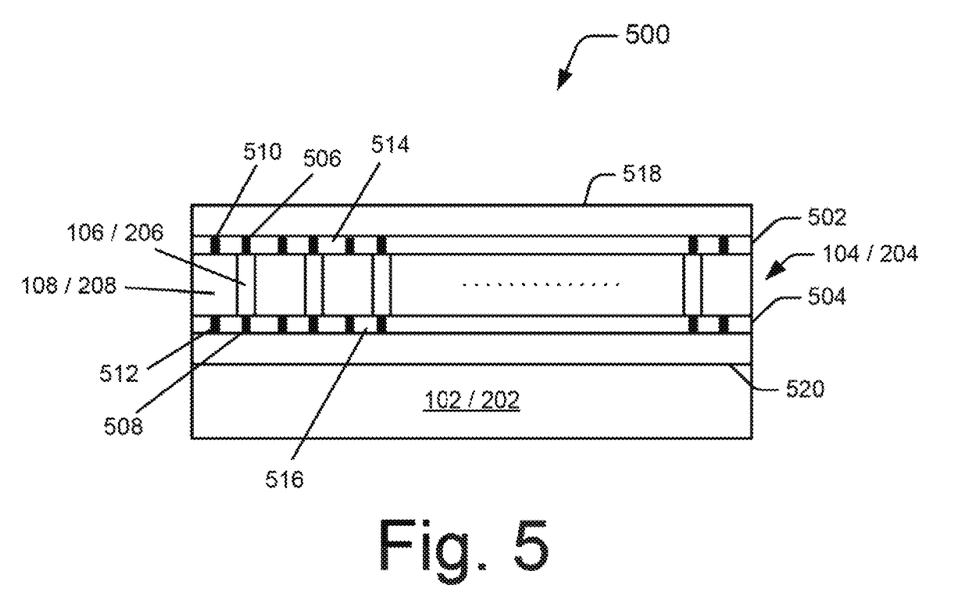
FIG. 5 illustrates a sectional view of a display control layer with transparent electrodes, according to an example implementation of the present subject matter.

FIG. 5 illustrates a sectional view of a display device 500 with transparent electrodes, according to an example implementation of the present subject matter. The display device 500 has a monolithic structure and includes a display control layer (e.g., 104, 204). The display control layer may be over an adhesive layer (e.g., 102) of a display control film pasted on a display screen of the display device 500, or directly over a display screen (e.g., 202) of the display device 500. As shown in FIG. 5, the display device 500 includes an upper electrodes layer 502 and a lower electrodes layer 504 across the display control layer. The transparent electrodes (e.g., 506 and 508 for each of the privacy-gate channels 106, 206 are across a height of the respective channel. The transparent electrodes (e.g., 510 and 512) for each of the blue/UV light absorption channels 108, 208 are also across a height of the respective channel. The regions (e.g., 514 and 516) between the transparent electrodes in the upper electrodes layer 502 and the lower electrodes layer 504 are filled with electrically insulating and optically transparent material, such as polyacrylic, polycarbonate and cyclic olefin copolymer (COC) polymers. Further, the display device 500 includes a glass or plastic layer 518 over the display control layer of the display device 500, and a glass or plastic layer 520 between the lower electrode layer 504 and the display screen of the display device 500. In an example implementation, display device 500 may also include a cover layer (not shown) as one of a cover lens, a hard transparent cover, and a touch sensor layer.

In an example implementation, the display control layer of the display device 500 may function in a twisted nematic mode. In the display device 500, the view angle of the display can be varied from ±90° to 0° about the perpendicular from the plane of the display device 500 by providing the first variable voltage from 0 V to a first predefined voltage across the privacy-gate channels. The first predefined voltage may, for example, be 1.8 V, 3.3 V, or 5 V depending on a driving voltage associated with a display mode controller of the display device 500. By varying the voltage from 0 V to the first predefined voltage across the privacy-gate channels in the display device 500, the transmission percentage of light from the first electrochromic material in the privacy-gate channels changes from 0% to 100%, thereby varying the view angle of the display from ±90° to 0° about the perpendicular from the plane.

Similarly, in the display device 500, the degree of blue/UV light absorption can be varied from 0% to 100% by providing the second variable, voltage from 0 V to a second predefined voltage across the blue/UV light absorption channels. The second predefined voltage may, for example, be 1.8 V, 3.3 V, or 5 V depending on a driving voltage associated with the display mode controller of the display device 500. By varying the voltage from 0 V to the second predefined voltage across the blue/UV light absorption channels in the display device 500, the transmission percentage of light from the second electrochromic material in the blue/UV light absorption channels changes from 0% to 100%, thereby varying the degree of blue/UV light absorption from 0% to 100%.

Figure 6:
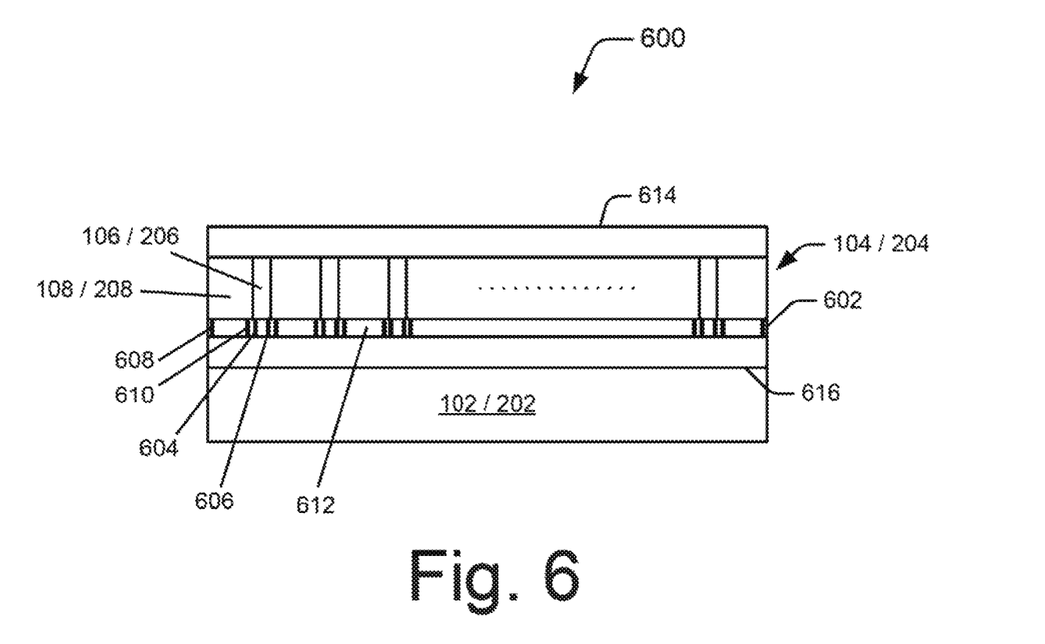
FIG. 6 illustrates a sectional view of a display control layer with transparent electrodes, according to an example implementation of the present subject matter.

FIG. 6 illustrates a sectional view of a display device 600 with transparent electrodes, according to an example implementation of the present subject matter. The display device 600 has a monolithic structure and includes a display control layer (e.g., 104, 204). The display control layer may, be over an adhesive layer (e.g., 102) of a display control film pasted on a display screen of the display device 600, or directly over a display screen (e.g., 202) of the display device 600. The display device 600 includes a layer of electrodes 602 on one side of the display control layer, such that the transparent electrodes (e.g., 604 and 606) for each of the privacy-gate channels 106, 206 are across a width of the respective, channel, and the transparent electrodes (e.g., 608 and 610) for each of the blue/UV light absorption channels 108, 208 are across a width of the respective channel. The regions (e.g., 612) between the transparent electrodes in the layer of electrodes 602 are filled with electrically insulating and optically transparent material, such as polyacrylic, polycarbonate and cyclic olefin copolymer (COC) polymers. Further, the display device 600 includes a glass or plastic layer 614 over the display control layer of the display device 600, and a glass or plastic layer 616 between the layer of electrodes 602 and the display screen of the display device 600. In an example implementation, display device 600 may also include a cover layer (not shown) as one of a cover lens, a hard transparent cover, and a touch sensor layer.

In an example implementation, the display control layer of the display device 600 may function in an in-plane switching mode. In the display device 600, the view angle of the display can be varied from ±90° to 0° about the perpendicular from the plane of the display device 600 by providing the first variable voltage from a first predefined voltage to 0 V across the privacy-gate channels. The first predefined voltage may, for example, be 1.8 V, 3.3 V, or 5 V depending on a driving voltage associated with a display mode controller of the display device 600. By varying the voltage from the first predefined voltage to 0 V across the privacy-gate channels in the display device 600, the transmission percentage of light from the first electrochromic material in the privacy-gate channels changes from 0% to 100% thereby varying the view angle of the display from ±90° to 0° about the perpendicular from the plane.

Similarly, in the display device 600, the degree of blue/UV light absorption can be varied from 0% to 100% by providing the second variable voltage from a second predefined voltage to 0 V across the blue/UV light absorption channels. The second predefined voltage value may, for example, be 1.8 V, 3.3 V, or 5 V depending on a driving voltage associated with the display mode controller of the display device 600. By varying the voltage from the second predefined voltage to 0 V across the blue/UV light absorption channels in the display device 600, the transmission percentage of light from the second electrochromic material in the blue/UV light absorption channels changes from 0% to 100%, thereby varying the degree of blue/UV light absorption from 0% to 100%.

Figure 7:
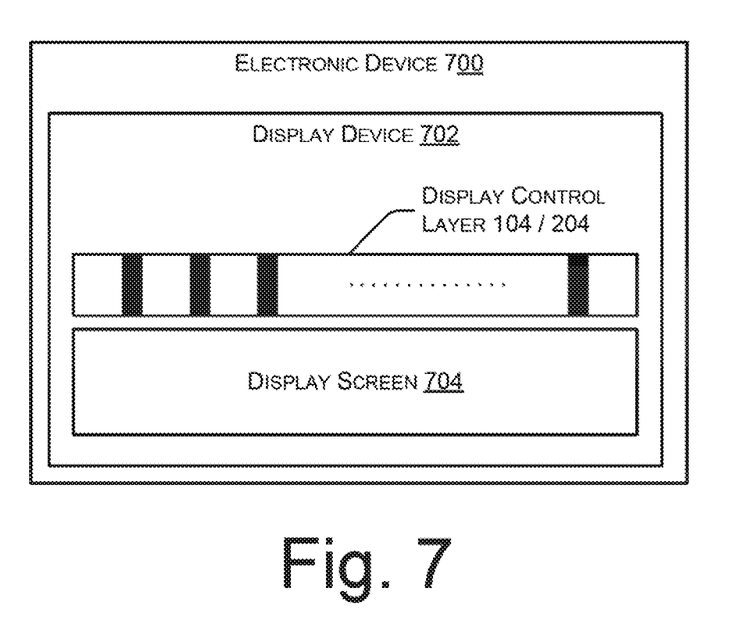
FIG. 7 illustrates an electronic device having a display device, according to an example implementation of the present subject matter.

FIG. 7 illustrates an electronic device 700 having a display device 702, according to an example implementation of the present subject matter. The display device 702 includes a display screen 704 and a display control layer. The display control layer is similar to the display control layer 104 or 204 of the display control film 100 or the display device 200, as described earlier. The electronic device 700 may also include a display mode controller (not shown) electrically coupled to the privacy-gate channels and the blue/UV light absorption channels in the display control layer on the display screen 704. The display mode controller of the electronic device 700 may operate in a similar manner as described earlier with respect to the display mode controller 310 or 410 to control the display from the display screen 704 of the display device 702, in accordance with present subject matter.

Although implementations for controlling displays from the display devices have been described in language specific to structural and functional features, it is to be understood that the present subject matter is not limited to the specific features described. Rather, the specific features are disclosed and explained as example implementations for controlling displays from the display devices.

We claim:

1. A display control film for a display device, comprising:
   an adhesive layer; and
   a display control layer over the adhesive layer, the display control layer comprising:
   a first set of channels filled with a first electrochromic material to control a view angle of a display from the display device; and
   a second set of channels filled with a second electrochromic material to control absorption of blue/ultraviolet (UV) light from the display device, wherein each adjacent pair of channels of the second set sandwiches a channel of the first set.

2. The display control film as claimed in claim 1, wherein the first electrochromic material comprises naphtalendiimide-functionalized PEDOT, poly(1,4-bis(2-thienyl)-naphthalene) (PBTN), poly(2,8-bis(2-thienyl)naphthalene) (P(2,8-BTN)), poly(2,8-bis-(4-dodecyl-thiophen-2-yl)-dibenzothiophene) (PDBT-3DTh), and poly(2,8-bis-(4-dodecyl-thiophen-2-yl)-dibenzofuran) (PDBF-3DTh).

3. The display control as claimed in claim 1, wherein the second electrochromic material comprises $WO_3$, $MoO_3$, $TiO_2$, $Ta_2O_5$, $Nb_2O_5$, $CeVO_4$, $SnO_2$, $IrO_2$, $CoO_2$, $MnO_2$, $FeO_2$, $Cr_2O_3$, $RhO_2$, $V_2O_5$, Prussian yellow, biphenyl-4,4'-diamine derivatives, 2,4,6-triphenyl-1,4'-bipyridine-1,1'-diium derivatives, viologen derivatives, pyridine derivatives, cyanine derivatives, styryl derivatives, poly [4,4-dioctyl-Cyclopentadithiophene-alt-4,7-(piazthiole)] (PDOCPDT-Cz), and N,N'-diphenyl-N,N'-diphenylene-phenylene diamine derivatives.

4. The display control film as claimed in claim 1, comprising transparent electrodes coupled to each channel of the first set and the second set for providing variable voltages across the first electrochromic material and across the second electrochromic material, respectively.

5. The display control film as claimed in claim 1, wherein, the first set of channels comprises a matrix of longitudinal channels arranged row-wise and column-wise in a plane of the display control film.

6. The display control film as claimed in claim 1, wherein each channel of the first set has a width in a range from about 10 μm to about 100 μm and a height in a range from about 100 μm to about 300 μm; and
   each channel of the second set has a width in a range from about 200 μm to about 500 μm and a height in a range from about 100 μm to about 300 μm.

7. A display device comprising:
   a display screen; and
   a display control layer over the display screen, the display control layer comprising:
   a set of privacy-gate channels filled with a first electrochromic material to control a view angle of a display from the display screen; and
   a set of blue/ultraviolet (UV) light absorption channels filled with a second electrochromic material to control absorption of blue/UV light from the display screen, wherein each privacy-gate channel of the set of privacy-gate channels is placed between and interfaced with two blue/UV light absorption channels of the set of blue/UV light absorption channels.

8. The display device as claimed in claim 7, wherein the display screen has color pixels and tracks of a black matrix covering spaces between the color pixels, and wherein the set of privacy-gate channels overlap the tracks of the black matrix.

9. The display device as claimed in claim 7, comprising a display mode controller electrically coupled to the set of privacy-gate channels and the set of blue/UV light absorption channels, wherein in a view angle control mode, the display mode controller is to provide a first variable voltage across the set of privacy-gate channels.

10. The display device as claimed in claim 7, comprising a display mode controller electrically coupled to the set of privacy-gate channels and the set of blue/UV light absorption channels, wherein in a blue/UV light absorption mode, the display mode controller is to provide a second variable voltage across the set of blue/UV light absorption channels.

11. The display device as claimed in claim 7, comprising a display mode controller electrically coupled to the set of privacy-gate channels and the set of blue/UV light absorption channels, wherein in a view angle control and blue/UV light absorption mode, the display mode controller is to provide a first variable voltage across the set of privacy-gate channels and provide a second variable voltage across the set of blue/UV light absorption channels.

12. The display device as claimed in claim 7, wherein the set of privacy-gate channels comprises a matrix of longitudinal channels arranged row-wise and column-wise in a plane of the display screen.

13. The display device as claimed in claim 12, comprising a display mode controller electrically coupled to each longitudinal channel of the matrix, wherein the display mode controller is to:
selectively provide a first variable voltage across a plurality of longitudinal channels arranged row-wise in the matrix to control a view angle of a display from one of a top-portion and a bottom-portion of the display screen; and
selectively provide the first variable voltage across a plurality of longitudinal channels arranged column-wise in the matrix to control a view angle of display from one of a right-portion and a left-portion of the display screen.

14. An electronic device comprising:
a display device having a display screen; and
a display control layer over the display screen, the display control layer comprising privacy-gate channels separated by blue/UV light absorption channels, wherein
the blue/ultraviolet (UV) light absorption channels are filled with a second electrochromic material to control absorption of blue/UV light from the display screen; and
the privacy-gate channels are in a forma matrix of longitudinal channels arranged row-wise and column-wise in a plane of the display screen and are filled with a first electrochromic material to control a view angle of a display from the display screen.

15. The electronic device as claimed in claim 14, comprising a display mode controller electrically coupled to the privacy-gate channels and the blue/UV light absorption channels, wherein
in a view angle control mode, the display mode controller is to:
selectively provide a first variable voltage across a plurality of privacy-gate channels arranged row-wise in the matrix to control a view angle of a display from one of a top-portion and a bottom-portion of the display screen; and
selectively provide the first variable voltage across a plurality of privacy-gate channels arranged column-wise in the matrix to control a view angle of a display from one of a right-portion and a left-portion of the display screen; and
in a blue/UV light absorption mode, the display mode controller is to provide a second variable voltage across the set of bluer UV light absorption channels.

* * * * *